Nov. 13, 1951 W. T. DUNN 2,574,778
MULTIPLE CLUTCH MECHANISM
Filed May 1, 1947 2 SHEETS—SHEET 1

INVENTOR.
WILLIAM T. DUNN
BY
Harness and Harris
ATTORNEYS.

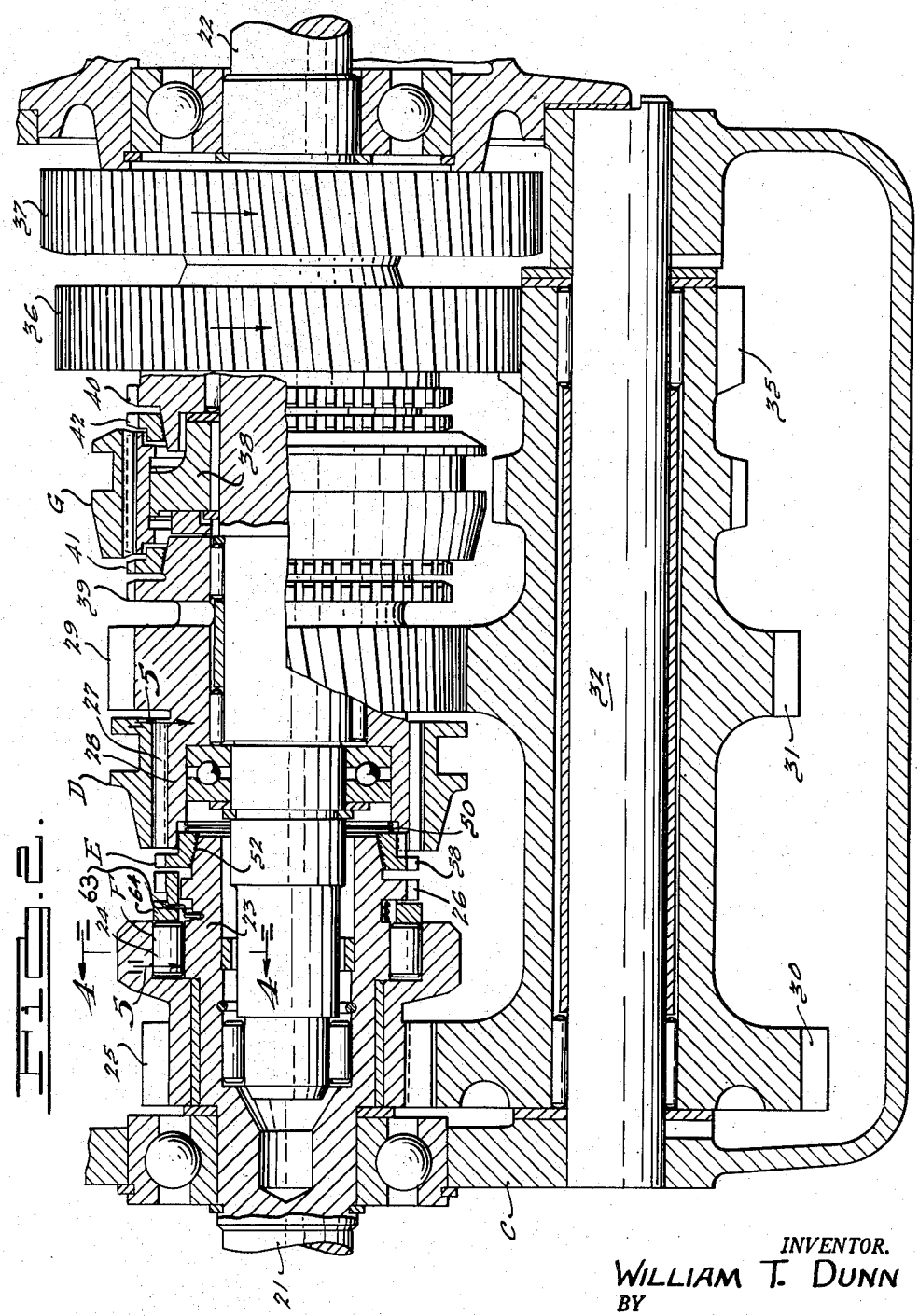

Patented Nov. 13, 1951

2,574,778

UNITED STATES PATENT OFFICE 2,574,778

MULTIPLE CLUTCH MECHANISM

William T. Dunn, Detroit, Mich., assignor to Chrysler Corporation, Highland Park, Mich., a corporation of Delaware Application May 1, 1947, Serial No. 745,210

7 Claims. (Cl. 192—48)

This invention relates to improvements in variable speed transmission mechanisms of the type particularly adapted for use in motor vehicles although in its broader aspects the invention may be used to advantage wherever transmission controls of the general type illustrated are employed.

Transmissions similar to that described in co-pending application Serial No. 596,842, filed May 31, 1945 by Augustin J. Syrovy et al., now Patent No. 2,490,604, employ a free wheeling unit between a pair of countershaft gears. This construction has been found to possess an undesirable characteristic which permits a condition referred to as an "uncontrolled no-back" to occur. An uncontrolled no-back may occur as an incident to an attempted upshift or downshift by the control apparatus. If the clutch sleeve described in the above application has its teeth partially engaged with the teeth of the main drive pinion at a time when the free wheeling unit is not neutralized and at this time a reverse torque is applied the condition is established. One way in which reverse torque may be applied is by the vehicle rolling backward on an incline. This condition of having the clutch teeth engaged and the free wheeling unit also engaged produces a lock-up between the first two sets of gears in the transmission because the drive pinion is being driven by the mainshaft rotating backwards and by the countershaft gear through the free wheeling unit. As the pinion cannot be driven at two different speeds, the transmission is in a locked condition. When this occurs the tooth pressure on the main drive pinion becomes so great that further movement of the clutch sleeve by the control apparatus cannot occur. If these conditions occur at the instant during which the engine ignition has been interrupted by the control apparatus then the engine ignition is permanently interrupted, for the restoring of the engine ignition is dependent upon continued movement of the clutch sleeve and movement of the clutch sleeve is dependent upon engine operation to provide fluid pressure. Servicing of the vehicle is then necessary to restore the ignition and engine operation.

Early attempts to provide apparatus that would prevent the above condition from being obtained, recognized that means should be provided to positively engage and rotate or "clock" the cage of the free wheeling unit to its overrunning position as an incident to movement of the clutch sleeve into engagement with the main drive pinion. Apparatus of this type is described in copending applications, Serial No. 582,671, filed March 14, 1945, now Patent Number 2,498,856, and Serial No. 696,703, filed September 13, 1946, now Patent Number 2,453,794, by Teno Iavelli. These constructions are not infallible because production tolerances do not permit maintenance of the required accurate relationship between the ignition interrupter switch, clutch sleeve teeth, main drive pinion teeth, countershaft, overrunning clutch, and engageable overrunning clutch and clutch sleeve components. The timing of the clocking of the cage of the free wheeling unit with relation to engagement of the clutch sleeve and main drive pinion teeth and interruption of the engine ignition must be accurately maintained.

It is an object of the invention to provide means for controlling the cage of the free wheeling unit in automatic transmissions of the types referred to so that a positive and accurate relationship may be established between the cage position and the position of the clutch sleeve and to assure that the free wheeling unit will be positively maintained in its overrunning position during all times that the clutch sleeve teeth are engaged or partially engaged with the main drive pinion teeth. Such control is desirable because of its ability to prevent the occurrence of the "uncontrolled no-back" condition referred to above.

It is a further object of this invention to provide an automatic transmission construction in which a free wheeling unit is located on the mainshaft and a solid countershaft gear cluster is used. It is much easier to manufacture a unitary countershaft gear cluster than to manufacture it from a plurality of components and attempt to maintain them in their proper relative positions. The thrusts obtained as an incident of the use of conventional helical gears increase the difficulties inherent in the use of a countershaft gear cluster assembled from a plurality of components.

In the drawings:

Fig. 2 is an elevation partly in section of a transmission embodying my invention;

Fig. 1 illustrates a typical motor vehicle power plant having a conventional engine A transmitting power through a hydraulic coupling and clutch assembly B, the drive then passing through transmission C to the rear vehicle ground wheels 20.

Figure 1:
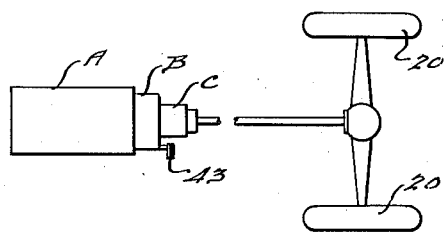
Fig. 1 is a diagrammatic plan view of the driving power plant of a motor vehicle.

The transmission C may be controlled by apparatus described in copending application, Serial No. 596,842, referred to above. In the description herein such controls will be only indirectly mentioned and reference may be had to the copending application for additional information about them. The invention to be described herein may be applied to other transmissions but reference is made to copending application, Serial No. 596,842, as an example of one transmission to which the invention may be applied.

The transmission C comprises an input or driving shaft 21 which receives drive from engine A by way of the clutch assembly B and an output or driven shaft 22 which is adapted to transmit drive to the vehicle ground wheels 20. The driving shaft 21 carries the cam portion 23 for the rollers 24 of a free wheeling unit or overrunning clutch F. A main drive pinion 25 is carried by the driving shaft 21 and may be rotated thereby through the overrunning clutch F. The driving shaft 21 also carries a set of clutch teeth 26.

A sleeve D is slidably splined on the axially fixed teeth 27 of a hub 28 carried by the driven third speed gear 29 which is rotatably journalled on the driven shaft 22 and adapted to be clutched thereto. The forward shift of sleeve D for clutching with teeth 26 is controlled by a blocker E whereby such clutching is limited to synchronous relationship in the speeds of rotation of shaft 21 and gear 29. When sleeve D is clutched with teeth 26 then the shaft 21 and gear 29 are in two-way direct drive relationship for a 1 to 1 speed ratio drive therebetween.

Gear 29 is also adapted to be driven from gear 25 at a speed ratio different from 1 to 1. A countershaft type one-way reduction driving means between these gears is illustrated. This drive comprises the coaxially rotatable countershaft gears 30 and 31 respectively in constant mesh with gears 25 and 29. The overrunning clutch F is operably interposed between the shaft 21 and gear 25. A stationarily mounted shaft 32 provides a journalled support for the countershaft gears. Assuming the usual clockwise rotation of shaft 21, as viewed when looking from front to rear of Fig. 2, then overrunning clutch F will automatically clutch shaft 21 and gear 29 together when shaft 21 is driven clockwise at a speed tending to exceed that of gear 29 if sleeve D is clutched with teeth 26 of driving shaft 21. If sleeve D is not clutched with teeth 26 then the drive of gear 29 is obtained from driving shaft 21 through the overrunning clutch F to gear 25 and from gear 25 to countershaft gears 30 and 31 to gear 29. The overrunning clutch F will automatically release the drive between the driving shaft 21 and the gear 25 to allow the driving shaft 21 to freely slow down below the speed of gear 25 when the vehicle is coasting with engine speed reduced.

As thus far described, it will be apparent that with the parts arranged as in Fig. 2, drive of shaft 21 will cause the output gear 20 to be driven at a reduction drive through overrunning clutch F, gears 25, 30 and 31. Should the sleeve D be biased forwardly during this reduction drive, blocker E will obstruct sleeve D in an intermediate position of its shift preventing engagement of its teeth with teeth 26. However, if the driver releases the engine throttle control in the form of the usual accelerator pedal, then as will be presently apparent, overrunning clutch F will allow driving shaft 21 to freely coast down relative to the sustained speed of gear 29 and when the speed of driving shaft 21 reaches that of gear 29, blocker E will move to an unblocking position and allow sleeve D to move further forwardly to clutch with teeth 26 under synchronous conditions to provide a direct drive from driving shaft teeth 26 to sleeve D to gear 29 with clutch F continuing its overrunning operation. Upon return of sleeve D to its disengaged Fig. 2 position followed by a speed-up of the engine overrunning clutch F will automatically engage to restore the reduction drive through gears 25, 30, and 31 to gear 29.

Transmission C is arranged to provide four forward speeds, neutral and reverse along with automatic coast step-up at sleeve D from first to second and from third to fourth. An accelerator pedal kickdown control may also be provided as described in copending application, Serial No. 596,842.

The countershaft has gears 30, 31, and 35 formed thereon. Meshed with gear 35 is a main shaft first speed gear 36 loose on the shaft 22, the latter carrying splined thereto the reverse gear 37. A reverse idler gear, not shown, may be provided to operatively connect gears 35 and 37.

A manually shiftable clutch G is slidably splined on a hub 38 fixed to shaft 22 and selectively clutches with teeth 39 or 40 under control of conventional synchronizer blockers 41 and 42 thereby to selectively clutch shaft 22 either with gear 29 or gear 36.

When clutch G is shifted forwardly to clutch with teeth 39 of gear 29 then with sleeve D released as in Fig. 2, there is provided a normal vehicle starting ratio in third speed through driving shaft 21, overrunning clutch F, gears 25, 30, 31, 29, 39, clutch G, hub 38, and driven shaft 22. If now sleeve D is clutched with teeth 26 as aforesaid, the fourth speed or direct drive is obtained through driving shaft 21, teeth 26, sleeve D, hub 28, gear 29, teeth 39, clutch G, hub 38, and driven shaft 22. For the kickdown from fourth to third, sleeve D is released thereby restoring third by picking up on the overrunning clutch F.

When clutch G is shifted rearwardly to clutch with teeth 40 of gear 36 then with sleeve D released as in Fig. 2, there is provided a maximum torque multiplying drive in first or low through driving shaft 21, overrunning clutch F, gears 25, 30, 35, 36, teeth 40, clutch G, hub 38, and driven shaft 22. If now sleeve D is clutched with teeth 26 as aforesaid, then second speed is obtained through driving shaft 21, teeth 26, sleeve D, hub 28, gears 29, 31, 35, 36, teeth 40, clutch G, hub 38, and driven shaft 22. For the kickdown from second to first, sleeve D is released thereby restoring first by picking up on the overrunning clutch F.

Clutch G is manually controlled. Sleeve D is controlled by automatic vehicle speed responsive apparatus described in copending application, Serial No. 596,842, referred to above.

Usually forward driving is effected by manually shifting clutch G forwardly for high range clutching with gear 29. The car is then accelerated in third with coast step-up to fourth thence automatically back to third under governor control in stopping or in response to accelerator kickdown when torque multiplication is desired through the transmission. Starts and stops are then made without declutching the pedal 43 in Fig. 1 as the fluid coupling allows the engine to idle with the car at rest.

The blocker E, previously referred to, is under a constant bias by a spring 50 of very light compression to cause the blocker to frictionally engage the cone portion 25 of the driving shaft 21 whereby the blocker attempts to assume the speed of shaft 21 within the limits allowed by a lost motion "clocking" connection with hub 28 provided by the engagement of blocker drive lug 54 in a recess 56 of hub 28. The blocker has blocking teeth 58 engageable with the teeth of sleeve D to perform the blocking function.

Figure 5:
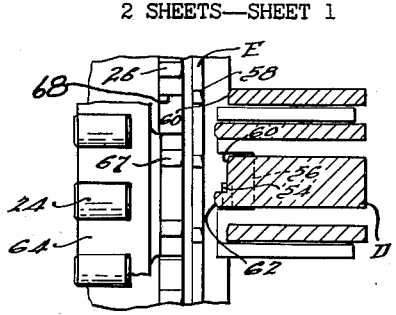
Fig. 5 is a partial development plan view indicated by the line 5—5 of Fig. 2 illustrating the clutch sleeve in fully released position.

In Fig. 5 the sleeve D is in its initial released position as shown in Fig. 2 and the engine is driving gear 29 through the reduction drive thus causing shaft 21 to rotate faster than gear 29. Blocker E is frictionally moved to one end of recess 56 leading the sleeve D.

Figure 7:
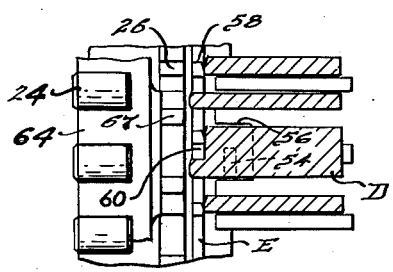
Fig. 7 is a similar view showing the clutch sleeve in drive blocked position.

In Fig. 7 the sleeve is shown biased forwardly to its intermediate blocked position during the Fig. 5 condition of drive. Any suitable means may be provided for biasing the sleeve D, as, for example, some form a servomotor energized under vehicle speed responsive control as disclosed in copending application, Serial No. 596,842, or the sleeve D might be biased manually. In Fig. 7 the drive lug 54 is in the position of leading the gear 29 as in Fig. 5 because shaft 21 is rotating faster than gear 29. Short teeth 60 now engage the blocker teeth 58 thus blocking sleeve D against further forward movement and long teeth 62 are extended between adjacent blocker teeth 58 but there is no ratcheting of the teeth of sleeve D with teeth 26 of shaft 21. This is the condition known as drive block of the sleeve D preparatory to clutching sleeve D with teeth 26 and may be maintained as long as required simply by maintaining of the speed of shift 21 faster than that of gear 29.

Figure 8:
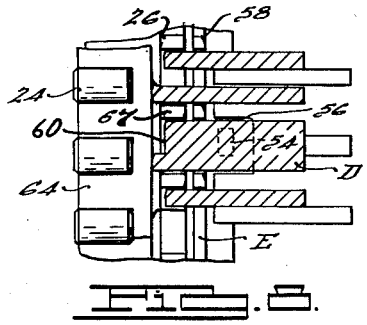
Fig. 8 is a similar view showing the clutch sleeve fully clutched with the teeth on the driving shaft.

If now the driver releases the accelerator pedal then the shaft 21 will begin to drop in speed and clutch F will overrun allowing gears 29 and 31 to maintain their speeds as the speed of shaft 21 falls off to approach the speed of gear 29. Blocker E will be finally moved by its friction connection at 52 causing the blocker teeth 58 to slide off the ends of the short teeth 60 whereupon the sustained forward bias of sleeve D causes pairs of the teeth 60, 62 to move forwardly between the space between adjacent blocker teeth 58 or finally to intergage with teeth 26 of shaft 21 as shown in Fig. 8. Thus clutching of sleeve D is effected under blocker control during engine coast from a condition of drive block, such clutching protecting the mechanism against clutching under engine torque and insuring smooth clutching.

Figure 6:
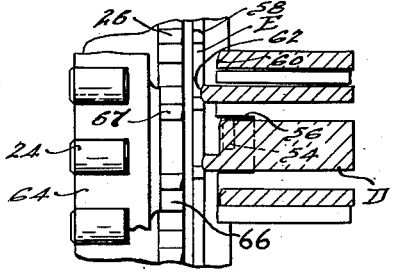
Fig. 6 is a similar view showing the clutch sleeve in coast blocked position.

Fig. 6 illustrates the condition of coast block from which clutching of sleeve D is prevented without first establishing the drive block condition. In Fig. 6, the sleeve D has been biased forwardly while the shaft 21 is rotating at a speed less than that of gear 29. This condition may be experienced where, for example, with the accelerator pedal released for engine idling, the vehicle accelerates from rest down a hill until the vehicle speed or other controlling instrumentality effects forward bias of sleeve D. Blocker E lags gear 29, the drive lug 54 being positioned at the end of recess 56 opposite to that shown in Figs. 5 and 7. Now the long teeth 62 engage the blocking teeth 58 holding the sleeve D blocked. If now the engine is accelerated by depressing the accelerator, shaft 21 speeds up and in approaching the speed of gear 29 causes blocker teeth 58 to be rotated clockwise with shaft 21 so as to slide off the ends of long teeth 62. Owing to the difference in the lengths of teeth 60 and 62 and because of the rotation of shaft 21 faster than gear 29, the sleeve D will not pass through the blocker teeth 58 as the ends of the short teeth 60 will engage the blocker teeth. Thus, in effect, the blocker teeth jump the gap between the long and short teeth and the parts become positioned in the Fig. 7 drive block relationship with the engine picking up the reduction drive through the overrunning clutch F. Then if the accelerator pedal is released for the coast, sleeve D will become clutched as illustrated in Fig. 8.

Figure 3:
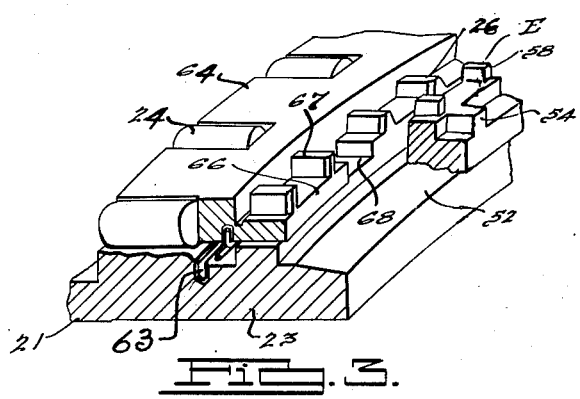
Fig. 3 is a perspective view of the free wheeling cage, the blocker and the main drive pinion teeth.
Figure 4:
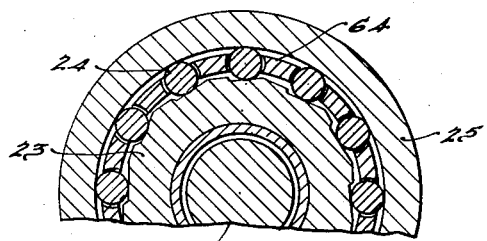
Fig. 4 is a section on the line 4—4 of Fig. 2.

The free wheeling unit or overrunning clutch F has its rollers 24 carried in a cage or carrier 64 in the conventional manner. The cage 64 is rotatably biased about the axis of the shaft 21 in a clockwise direction in Fig. 4 by a spring 63 illustrated in Figs. 2 and 3. This effects a one way friction drive connection between shaft 21 and gear 25. The cage 64 is provided at spaced intervals around its circumference with extensions 66. The teeth 26 of shaft 21 are provided with recessed portions 68 at spaced intervals. Each recessed portion 68 is adapted to receive an extension 66 of the cage 64 of the overrunning clutch F. The recessed portions 68 preferably have a circumferential length which is greater than the length of the associated extension 66 so that a clocking of the cage 64 relative to the cam portion 23 of the free wheeling unit is permitted. Each extension 66 of the cage 64 carries one or more teeth 67. The teeth 67 are generally arranged in the same plane, normal to the axis of shaft 21, as the teeth 26 of the driving shaft 21 and are adapted to be engaged by the teeth of the sleeve D to rotate or "clock" the cage 64 as the teeth of the sleeve D moves into engagement with the teeth 26 of shaft 21. The teeth 67 act as cam elements adapted to be engaged by clutch D to clock the cage 64. The teeth 67 may if desired have a pointed or rounded forward surface to act as a cam surface. There is thus provided a positive means for clocking the cage 64 of the free wheeling unit F into its overrunning position at all times during which the sleeve D has its teeth in engagement with the teeth 26 of the shaft 21. The direct engagement of the teeth of sleeve D with the teeth 67 of the cage 64 eliminates any possibility of the sleeve D being engaged with the teeth 26 at a time when the free wheeling unit F is in other than its overrunning position. The direct contact of the teeth of sleeve D with the teeth of the cage 64 also assures that manufacturing tolerances will not destroy the accurate relationship which must be maintained between the position of the sleeve D and the position of the cage 64.

I claim:

1. In combination, a driving member, a driven member, drive transmitting means including an overrunning clutch for connecting said members in driving relation, said clutch comprising a plurality of rollers and opposite surfaces between which the rollers are adapted to wedge for locking up the clutch, a carrier for said rollers and movable with the rollers, a positive type clutch for connecting said members in driving relation, said positive clutch comprising a first set of teeth on said driving member and an axially movable member drivingly connected to said driven member and provided with a second set of teeth for engaging said first set of teeth, a cam on said carrier located adjacent said first set of teeth, said cam being adapted to cooperate with said second set of teeth whereby, when the axially movable member is moved to engage the positive clutch, the carrier is cammed by the second set of teeth and the rollers are moved out of position for wedging between said opposite surfaces, thereby rendering the one way clutch inoperative.

2. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, said overrunning clutch comprising a plurality of friction driving elements and a cage element therefor, means operating to rotatably bias said cage element about its axis and in a direction for moving said friction elements into positions effecting a one-way friction drive connection of said members, means associated with said cage element and adapted to provide a plurality of cam faces, said cam faces being positioned for engagement by the second set of teeth of said sleeve as said first and said second sets of clutch teeth are engaged, said cam faces being so constructed and arranged that, when said sleeve is moved to engage said first and second sets of teeth, said cage element is rotatably operated relative to said sleeve in a direction opposite to that effected by said biasing means thereby moving said friction elements into positions for preventing establishment of said one-way friction drive connection between said members.

3. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, said overrunning clutch comprising a plurality of friction driving elements and a cage element therefor, means operating to rotatably bias said cage element about its axis and in a direction for moving said friction members into positions effecting a one-way friction drive connection of said members, a plurality of teeth formed on said cage element and disposed in circumferential alignment with and at substantially the same axial position as the first set of teeth carried by said driving member, the teeth of said cage element being positioned for engagement by the teeth of said sleeve when said sleeve is shifted to engage the first and second sets of teeth, the initial engagement of said cage teeth occurring substantially with the engagement of said clutch teeth, said cage element being so arranged and constructed that the engagement of its teeth by the teeth of said sleeve causes said cage element to be rotatably operated relative to said races in a direction opposite to that effected by said biasing means thereby moving said friction members into positions for preventing establishment of said one-way friction drive connection between said members.

4. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, said overrunning clutch comprising a plurality of friction driving elements and a cage therefor, means operating to rotatably bias said cage about its axis and in a direction for moving said friction elements into positions effecting a one-way friction drive connection of said members, a plurality of teeth operatively connected to said cage and aligned with said first set of teeth, the teeth associated with said cage being positioned for engagement by the teeth of said sleeve simultaneously with the engagement of said first and said second sets of clutch teeth, the teeth associated with said cage being so constructed and arranged that when said sleeve is moved to engage said first and second sets of teeth that said cage is rotatably operated in a direction opposite to that effected by said biasing means thereby moving said friction elements into positions for preventing establishment of one-way friction drive connection between said members.

5. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, said overrunning clutch means comprising a plurality of friction driving elements and a cage element therefor, means operating to rotatably bias said cage element about its axis and in a direction for moving said friction elements into positions effecting a one-way friction driving connection of said members, said first set of clutch teeth being interrupted to provide a space, said cage element being provided with an extension located in said space, said space having greater circumferential length than said extension whereby said extension may rotate in said space relative to said first set of clutch teeth, said cage element being provided with a plurality of teeth formed on said extension in substantial circumferential alignment with said first set of clutch teeth, the teeth on said extension being positioned for engagement by the second set of clutch teeth as said sleeve is moved to engage said first and second sets of teeth, the teeth on said extension being so constructed and arranged that, when said sleeve is so positioned that said first and second sets of clutch teeth are engaged said cage element is rotatably operated relative to said driving shaft in a direction opposite to that effected by said biasing means thereby moving said friction elements into positions for preventing establishment of one-way friction drive connection between said members.

6. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, said overrunning clutch means comprising a plurality of friction driving elements and a cage element therefor, means operating to rotatably bias said cage element about its axis and in a direction for moving said friction elements into positions effecting a one-way friction drive connection of said members, means associated with said cage element and adapted to provide a plurality of cam faces, said cam faces being positioned for engagement by the teeth of said sleeve at substantially the same instant as said first and said second sets of clutch teeth are being engaged to rotatably operate said cage element relative to said sleeve in a direction opposite to that effected by said biasing means thereby moving said friction elements into positions for preventing establishment of said one-way friction drive connection between said members.

7. In combination, a driving member, a driven member, drive transmitting means including an overrunning clutch for connecting said members in driving relation and a positive type clutch for connecting said members in driving relation, said positive clutch comprising a first set of teeth on said driving member and an axially movable sleeve drivingly connected to said driven member and provided with a second set of teeth for engaging said first set of teeth, and movable through a predetermined path as an incident to movement of said sleeve, said overrunning clutch comprising a plurality of friction driving elements and a cage element therefor, means operating to rotatably bias said cage element about its axis and in a direction for moving said friction elements into positions effecting a one-way friction drive connection of said members, means associated with said cage element and adapted to provide a plurality of cam faces, said cam faces being positioned in said path for engagement by said second teeth as an incident to movement of said sleeve to engage said first and second sets of teeth, said cam faces being so constructed and arranged that, when said sleeve is moved to engage said first and second sets of teeth, said cage element is rotatably operated relative to said sleeve in a direction opposite to that effected by said biasing means thereby moving said friction elements into positions for preventing establishment of said one-way friction drive connection between said members.

WILLIAM T. DUNN.

REFERENCES CITED

The following references are of record in the file of this patent:

UNITED STATES PATENTS

| Number | Name | Date |
| --- | --- | --- |
| Re. 20,685 | Burtnett | Apr. 5, 1938 |
| 1,931,260 | Lapsley | Oct. 17, 1933 |
| 2,077,253 | Nardone | Apr. 13, 1937 |
| 2,309,864 | Patterson | Feb. 2, 1943 |
| 2,348,763 | Syrovy et al. | May 16, 1944 |
| 2,349,297 | Neracher et al. | May 23, 1944 |
| 2,403,378 | Kilpela | July 2, 1946 |

FOREIGN PATENTS

| Number | Country | Date |
| --- | --- | --- |
| 274,571 | Great Britain | July 25, 1927 |